(12) United States Patent
Richardson et al.

(10) Patent No.: US 11,554,801 B2
(45) Date of Patent: Jan. 17, 2023

(54) CART APPARATUSES INCLUDING CART INTERLOCK MECHANISMS

(71) Applicant: Toyota Motor Engineering & Manufacturing North America, Inc., Plano, TX (US)

(72) Inventors: Jessie L. Richardson, Georgetown, KY (US); James A. Fluty, II, Winchester, KY (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 237 days.

(21) Appl. No.: 17/011,201

(22) Filed: Sep. 3, 2020

(65) Prior Publication Data

US 2022/0063693 A1 Mar. 3, 2022

(51) Int. Cl.
*B62B 3/14* (2006.01)

(52) U.S. Cl.
CPC .................. *B62B 3/1404* (2013.01)

(58) Field of Classification Search
CPC ......... B62B 3/08; B62B 3/06; B62B 2202/90; B62B 2207/02; B62B 3/1404; B62B 3/14; B62D 53/005; B62D 63/06
USPC .................................................. 280/33.992
See application file for complete search history.

(56) References Cited

U.S. PATENT DOCUMENTS

| 6,715,979 B1* | 4/2004 | Theising | A47B 91/002 414/458 |
| 9,211,900 B2* | 12/2015 | Knepp | B62B 3/08 |
| 2015/0225007 A1* | 8/2015 | Knepp | B62B 3/08 280/47.18 |

FOREIGN PATENT DOCUMENTS

| CA | 2331038 A1 | 8/2001 |
| CN | 209351448 U | 9/2019 |
| JP | 2019051847 A | 4/2019 |
| WO | 2012154872 A2 | 11/2012 |

* cited by examiner

*Primary Examiner* — James A Shriver, II
*Assistant Examiner* — Hilary L Johns
(74) *Attorney, Agent, or Firm* — Dinsmore & Shohl LLP

(57) ABSTRACT

A cart apparatus includes a child cart that includes a base frame structure including a pair of side beams and a lateral beam that extends between the pair of side beams. A parent cart includes a base frame structure including a pair of side beams and a lateral beam that extends between the pair of side beams. The base frame structure of the parent cart defines a nesting area that is sized and arranged to receive the base frame structure of the child cart. A cart interlock mechanism includes an engagement member that is rotatably mounted to the base frame structure and a foot pedal that is linked to the engagement member. The foot pedal rotates the engagement member from a locked position that engages the base frame of the child cart to an unlocked position that releases the base frame of the child cart.

13 Claims, 4 Drawing Sheets

CART APPARATUSES INCLUDING CART INTERLOCK MECHANISMS

TECHNICAL FIELD

The present specification generally relates to cart apparatuses and, more specifically, to cart apparatuses that include cart interlock mechanisms for locking a child cart to a parent cart.

BACKGROUND

Dolly or cart apparatuses may be used within manufacturing environments to carry relatively heavy loads of parts, such as automobile parts for an assembly line. It is known to have larger parent carts that interact with smaller child carts, where the child carts can detach and move independently of the parent carts. The mechanisms for locking the child carts and parent carts together can be relatively bulky and difficult to operate depending on the size and shape of the parts being carried by the carts.

What is needed are cart apparatuses that include cart interlocking mechanisms that are located near a frame structure of the parent cart that can be pedal-actuated by foot.

SUMMARY

In one embodiment, a cart apparatus includes a child cart that includes a base frame structure including a pair of side beams and a lateral beam that extends between the pair of side beams. A parent cart includes a base frame structure including a pair of side beams and a lateral beam that extends between the pair of side beams. The base frame structure of the parent cart defines a nesting area that is sized and arranged to receive the base frame structure of the child cart. A cart interlock mechanism includes an engagement member that is rotatably mounted to the base frame structure and a foot pedal that is linked to the engagement member. The foot pedal rotates the engagement member from a locked position that engages the base frame of the child cart to an unlocked position that releases the base frame of the child cart.

In another embodiment, a parent cart of a cart apparatus includes a base frame structure including a pair of side beams and a lateral beam that extends between the pair of side beams. The base frame structure defines a nesting area that is sized and arranged to receive a base frame structure of a child cart. A cart interlock mechanism includes an engagement member that is rotatably mounted to the base frame structure and a foot pedal that is linked to the engagement member. The foot pedal rotates the engagement member from a locked position that engages the base frame of the child cart to an unlocked position that releases the base frame of the child cart.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to cart apparatuses that include a relatively large parent cart that includes a nesting area that is sized to receive a relatively smaller child cart. The parent cart includes a base frame structure that extends generally parallel to a floor with wheels that facilitate movement of the parent cart along the floor. The child cart also includes a base frame structure that extends generally parallel to the floor with wheels that facilitate movement of the child cart along the floor. The parent cart further includes a cart interlock mechanism that locks the child cart to the parent cart with the child cart located in the nesting area. The cart interlock mechanism includes an engagement member that includes locking teeth. The engagement member is rotatably mounted to a lateral beam of the base frame structure that provides a forward-most boundary for the nesting area. The engagement member is linked to an actuation device, such as a foot pedal, such that actuation of the actuation device moves the engagement member from a locked position with the locking teeth engaged with the child cart to an unlocked position with the locking teeth rotated out of engagement with the child cart.

Figure 1:
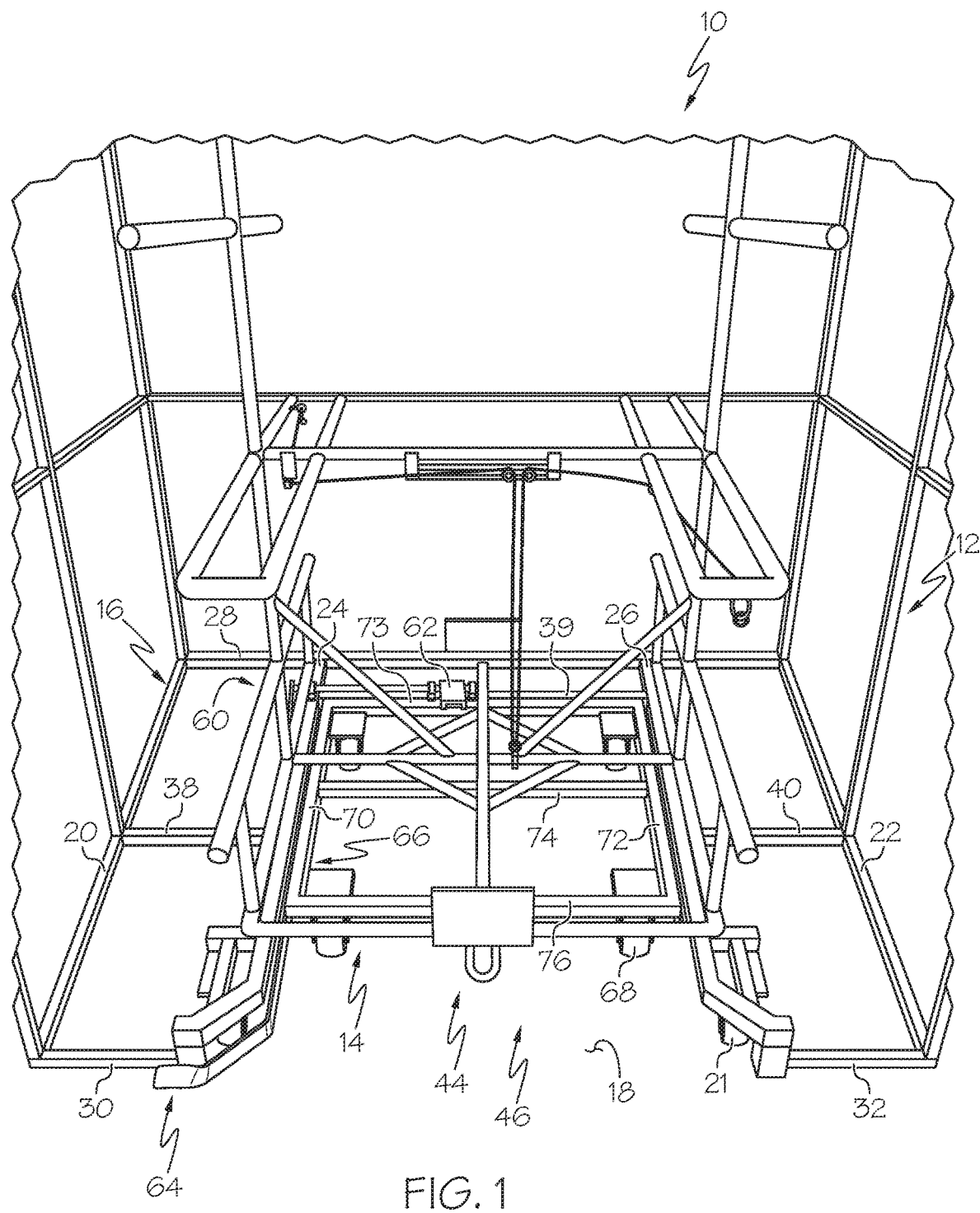
FIG. 1 is a rear perspective view of a cart assembly including a parent cart and a child cart that is nested within a nesting area of the parent cart, according to one or more embodiment shown and described herein.

Referring to FIG. 1, a cart apparatus 10 includes a relatively large parent cart 12 and a relatively small child cart 14. The parent cart 12 includes a base frame structure 16 that extends generally parallel to a floor 18 and includes wheels 21 to facilitate movement of the parent cart 12 along the floor 18. The base frame structure 16 includes outer side beams 20 and 22 and inner side beams 24 and 26. The side beams 20, 22, 24 and 26 generally extend lengthwise in a longitudinal direction. As used herein, the longitudinal direction refers to the forward/rearward direction of the cart apparatus 10, where forward is the primary towing direction of the cart apparatus 10. The base frame structure 16 of the parent cart 12 also includes outer lateral beams 28 and 30, 32 with lateral beam 28 located at a front 34 of the parent cart 12 and lateral beams 30, 32 located at a rear 36 of the parent cart 12. Another lateral beam 39 forms a forward-most boundary for nesting area 44. As used herein, the lateral direction refers to the side-to-side direction of the cart apparatus 10 and is perpendicular to the longitudinal direction. Inner lateral beams 38, 39 and 40 and lateral beams, 28, 30 and 32 connect the side beams 20 and 24, 22 and 26 to provide the base frame structure 16.

The parent cart 12 includes the nesting area 44 that is sized to receive the child cart 14. The nesting area 44 is formed between the inner side beams 24 and 26 and the lateral beam 28. An entrance 46 is provided between the lateral beams 30 and 32 to allow for ingress and egress of the child cart 14 from the nesting area 44. As will be described in greater detail below, the parent cart 12 further includes a cart interlock mechanism 60. The cart interlock mechanism 60 includes an engagement member 62 that is rotatably mounted to the lateral beam 28 that is linked to an actuation device 64 that moves the engagement member 62 from a locked position engaging the child cart 14, as shown by FIG. 1, to an unlocked position that disengages the child cart 14. In the embodiment of FIG. 1, the actuation device 64 is a foot pedal.

The child cart 14 includes a base frame structure 66 that extends generally parallel to the floor 18 and includes wheels 68 to facilitate movement of the child cart 14 along the floor 18. The base frame structure 66 includes side beams 70 and 72 that generally extend lengthwise in the longitudinal direction and lateral beams 73, 74 and 76 that extend between the side beams 70 and 72 to form the base frame structure 66. The engagement member 62 engages the lateral beam 73 or 76 depending on the direction the child cart 14 is guided into the nesting area 44.

The child cart 14 may include and suitable support structures for supporting components thereon. In the illustrated example, the child cart 14 is sized and configured for supporting front bumpers of an automobile. However, the child cart may be formed to support other components.

Figure 2:
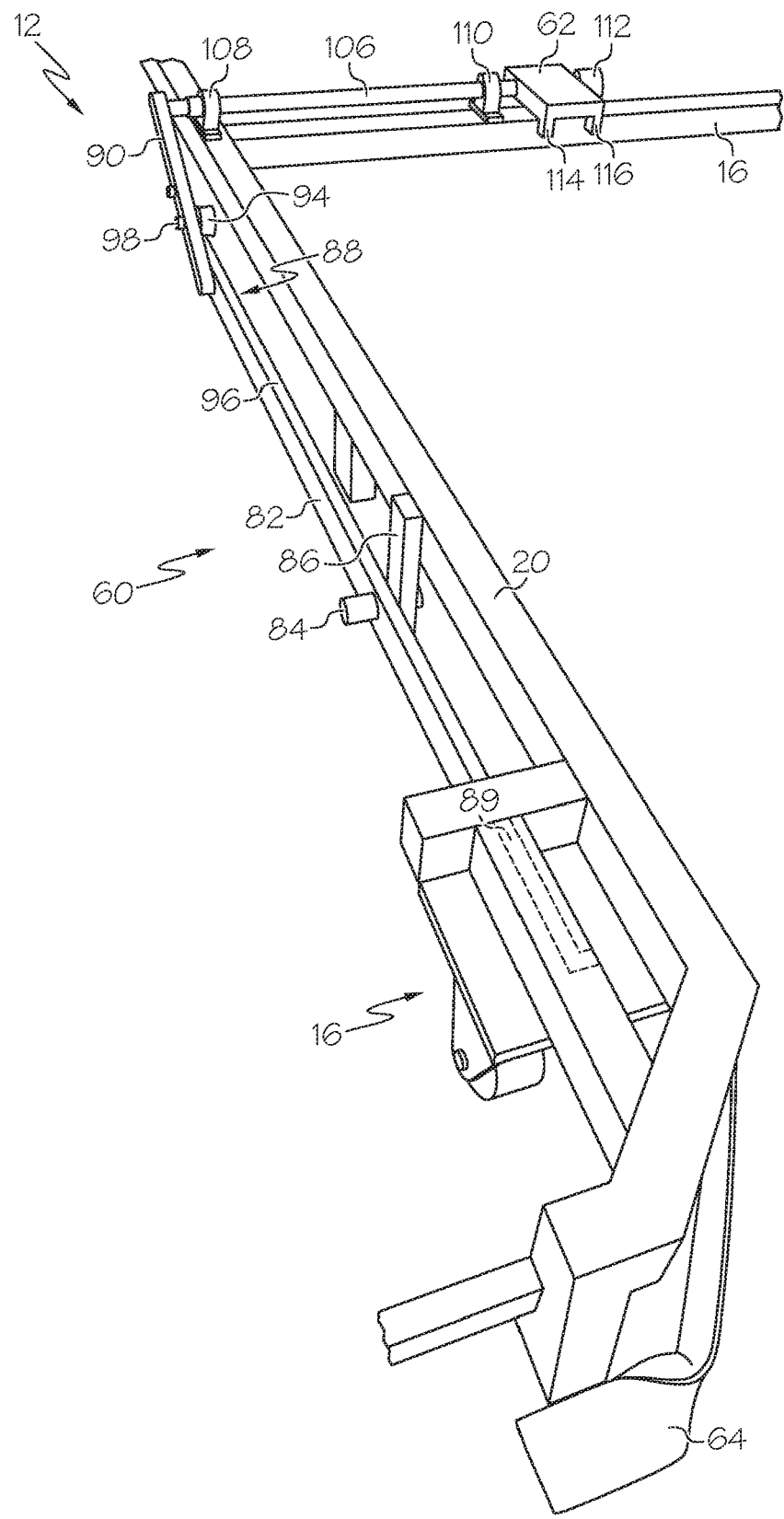
FIG. 2 is a partial perspective view of the parent cart of FIG. 1 including cart interlock mechanism in a locked position, according to one or more embodiments shown and described herein.

FIG. 2 illustrates a partial view of the parent cart 12 showing the cart interlock mechanism 60 in more detail. The cart interlock mechanism 60 includes the foot pedal 64 that is linked to the engagement member 62 by a linkage 80. In particular, the foot pedal 64 is connected to a relatively elongated arm 82 that pivots around a pivot location 84 that is connected to the side beam 20 by a vertical support rod 86. As represented by dashed lines, the foot pedal 64 may be connected to the elongated arm 82 by a section 89 that extends beneath the base frame structure 16.

The elongated arm 82 extends from the foot pedal 64 to an end portion 88 that is linked to a relatively short following arm 90. The following arm 90 is connected to a follower member 94 (e.g., a roller) that rolls along an edge 96 of the elongated arm 82 as the elongated arm 82 is rotated using the foot pedal 64. In some embodiments, a position of the follower member 94 may be adjusted along a length of the following arm 90 using fastener 98 in order to tune movement of the following arm 90 relative to the elongated arm 82.

Figure 3:
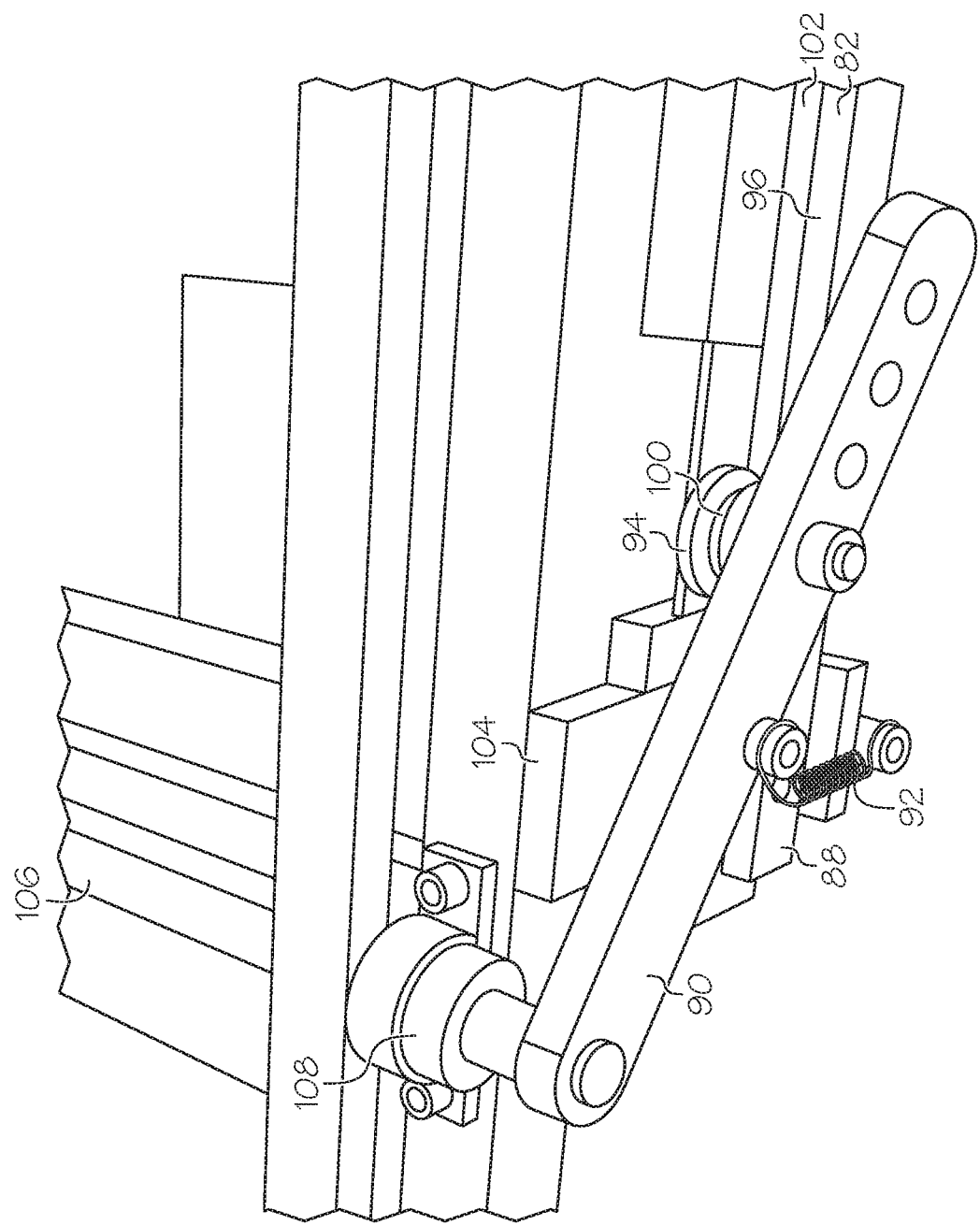
FIG. 3 is a side partial view of the cart interlock mechanism of FIG. 2, according to one or more embodiment shown and described herein.

Referring to FIG. 3, a more detailed view of the link between the elongated arm 82 and the following arm 90 is illustrated. The roller 94 may include a circumferential groove 100 formed therein to engage the edge 96 of the elongated arm 82 and ride there along. In some embodiments, the edge 96 of the elongated arm 82 may be contoured to correspond to the shape of the groove 100. In some embodiments, the elongated arm 82 may include a track bar 102 connected thereto along which the roller 94 moves. A stop member 104 may be provided that inhibits the roller 94 from rolling off the end portion 88 of the elongated arm 82 and also inhibits over-rotation of the elongated arm 82 during operation.

The following arm 90 is connected to an actuation rod 106 such that the actuation rod 106 rotates with the following arm 90. The actuation rod 106 extends from the following arm 90, through a support bearing 108 that is mounted to the base frame structure 16. Referring back to FIG. 2, the actuation rod 106 extends in the lateral direction from the support bearing 108 to the engagement member 62 that is also rotatably mounted to the base frame structure 16 by support bearings 110 and 112. The engagement member 62 includes locking teeth 114 that are sized to engage the lateral beam 73 of the child cart 14 (FIG. 1) in the locked position. In some embodiments, the locking teeth 114 may include a ramp surface 116 that causes the engagement member 62 to rotate up into the unlocked position as the child cart 14 is brought into engagement with the engagement member 62.

Figure 4:
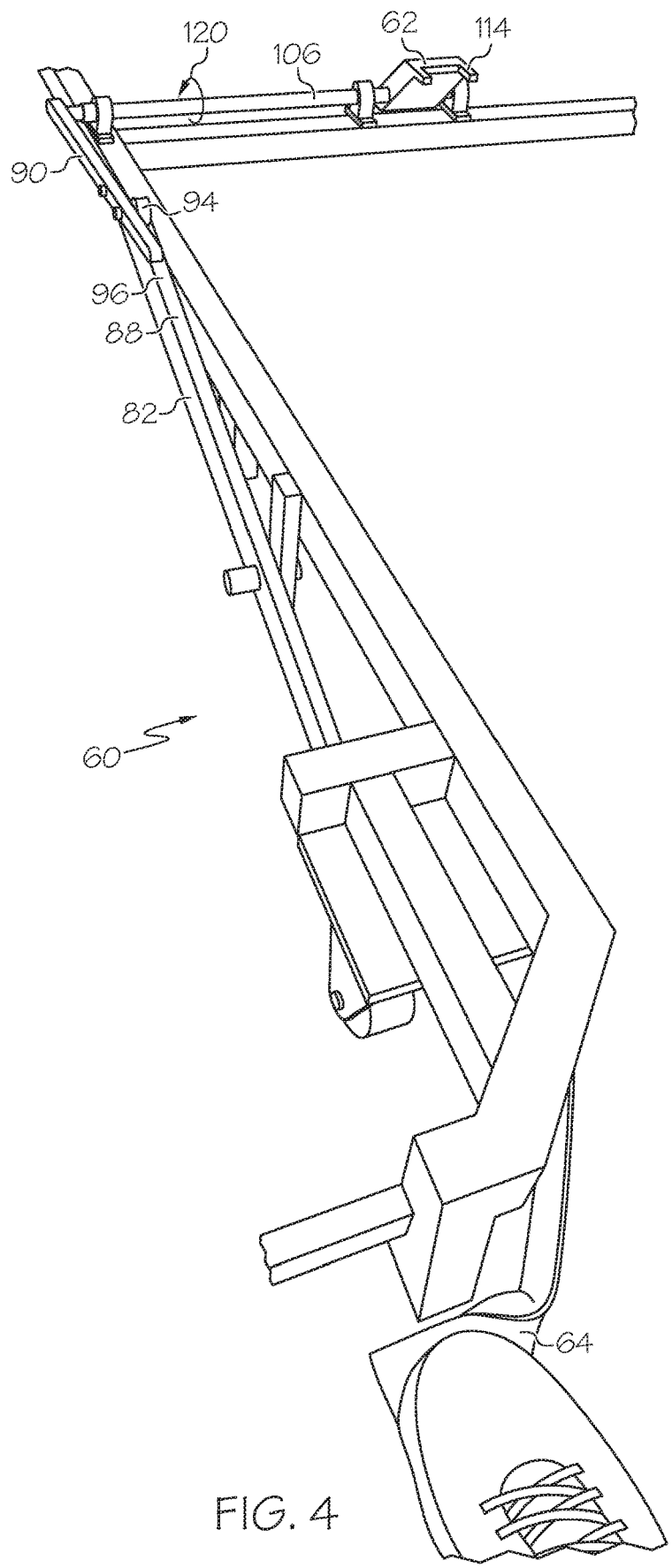
FIG. 4 is a partial perspective view of the cart interlock mechanism of FIG. 2 in an unlock position, according to one or more embodiment shown and described herein.

Referring to FIG. 4, the cart interlock mechanism 60 is illustrated in the unlocked position. In operation, an operator places a foot on the foot pedal 64 and pushes down on the foot pedal 64. Downward movement of the foot pedal 64 causes the end portion 88 of the elongated arm 82 to raise. As the end portion 88 raises the roller 94 rolls along the edge 96 of the elongated arm 82, which causes the following arm 90 to rotate in the direction of arrow 120. Rotation of the following arm 90 also causes the actuation rod 106 to rotate due to the fixed connection between the following arm 90 and the actuation rod 106. Rotation of the actuation rod 106 causes the engagement member 62 to rotate thereby lifting the locking teeth 114 out of engagement with the lateral beam 73 of the child cart 14 (FIG. 1), which allows for removal of the child cart 14 from the nesting area 44. Gravity may bias the engagement member 62 toward the locked position. In some embodiments, a spring 92 (FIG. 3) may be used to provide a biasing force toward the locked position.

The above-described cart apparatuses include a cart interlock mechanism that is pedal-actuated and includes an engagement member having a low profile that does not occupy a large amount of space in either of the locked or unlocked positions. In this regard, the cart apparatuses can be used to transport parts of a variety of shapes and sizes while still allowing for locking and unlocking of the parent and child carts. Further, because the cart interlock mechanism is pedal-operated, an operator's hands can be free to move the child carts from the parent carts while the cart interlock mechanism is in the unlocked position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cart apparatus comprising:
   a child cart comprising a base frame structure comprising a pair of side beams and a lateral beam that extends between the pair of side beams; and
   a parent cart comprising:
      a base frame structure comprising a pair of side beams and a lateral beam that extends between the pair of side beams, the base frame structure of the parent cart defining a nesting area that is sized and arranged to receive the base frame structure of the child cart; and a cart interlock mechanism comprising an engagement member that is rotatably mounted to the base frame structure and a foot pedal that is linked to the engagement member, wherein the foot pedal rotates the engagement member from a locked position that engages the base frame of the child cart to an unlocked position that releases the base frame of the child cart;

wherein the engagement member comprises one or more locking teeth that engage the lateral beam of the base frame structure of the child cart in the locked position.

2. The cart apparatus of claim 1, wherein the cart interlock mechanism comprises an actuation rod connected to the engagement member and linked to the foot pedal such that downward movement of the foot pedal rotates the actuation rod and the engagement member from the locked position to the unlocked position.

3. The cart apparatus of claim 2, wherein the cart interlock mechanism comprises:

an elongated arm connected to the foot pedal, the elongated arm rotatably mounted to one of the side beams of the base frame of the parent cart; and a following arm connected to the actuation rod, the following arm linked to an end portion of the elongated arm such that rotation of the elongated arm rotates the following arm.

4. The cart apparatus of claim 3, wherein the following arm comprises a roller that rolls along an edge of the end portion of the elongated arm.

5. The cart apparatus of claim 4, wherein the roller comprises a circumferential groove that is sized to receive the edge of the elongated arm.

6. A parent cart of a cart apparatus, the parent cart comprising:

a base frame structure comprising a pair of side beams and a lateral beam that extends between the pair of side beams, the base frame structure defining a nesting area that is sized and arranged to receive a base frame structure of a child cart; and a cart interlock mechanism comprising an engagement member that is rotatably mounted to the base frame structure and a foot pedal that is linked to the engagement member, wherein the foot pedal rotates the engagement member from a locked position that engages the base frame of the child cart to an unlocked position that releases the base frame of the child cart;

wherein the engagement member comprises one or more locking teeth that engage the base frame structure of the child cart in the locked position.

7. The parent cart of claim 6, wherein the cart interlock mechanism comprises an actuation rod connected to the engagement member and linked to the foot pedal such that downward movement of the foot pedal rotates the actuation rod and the engagement member from the locked position to the unlocked position.

8. The parent cart of claim 7, wherein the cart interlock mechanism comprises:

an elongated arm connected to the foot pedal, the elongated arm rotatably mounted to one of the side beams of the base frame; and a following arm connected to the actuation rod, the following arm linked to an end portion of the elongated arm such that rotation of the elongated arm rotates the following arm.

9. The parent cart of claim 8, wherein the following arm comprises a roller that rolls along an edge of the end portion of the elongated arm.

10. The parent cart of claim 9, wherein the roller comprises a circumferential groove that is sized to receive the edge of the elongated arm.

11. A parent cart of a cart apparatus, the parent cart comprising:

a base frame structure comprising a pair of side beams and a lateral beam that extends between the pair of side beams, the base frame structure defining a nesting area that is sized and arranged to receive a base frame structure of a child cart; and a cart interlock mechanism comprising an engagement member that is rotatably mounted to the base frame structure and a foot pedal that is linked to the engagement member, wherein the foot pedal rotates the engagement member from a locked position that engages the base frame of the child cart to an unlocked position that releases the base frame of the child cart;

wherein the cart interlock mechanism comprises an actuation rod connected to the engagement member and linked to the foot pedal such that downward movement of the foot pedal rotates the actuation rod and the engagement member from the locked position to the unlocked position;

wherein the cart interlock mechanism comprises:

an elongated arm connected to the foot pedal, the elongated arm rotatably mounted to one of the side beams of the base frame; and a following arm connected to the actuation rod, the following arm linked to an end portion of the elongated arm such that rotation of the elongated arm rotates the following arm;

wherein the following arm comprises a roller that rolls along an edge of the end portion of the elongated arm.

12. The parent cart of claim 11, wherein the engagement member comprises one or more locking teeth that engage the base frame structure of the child cart in the locked position.

13. The parent cart of claim 11, wherein the roller comprises a circumferential groove that is sized to receive the edge of the elongated arm.

* * * * *